Figure 1:
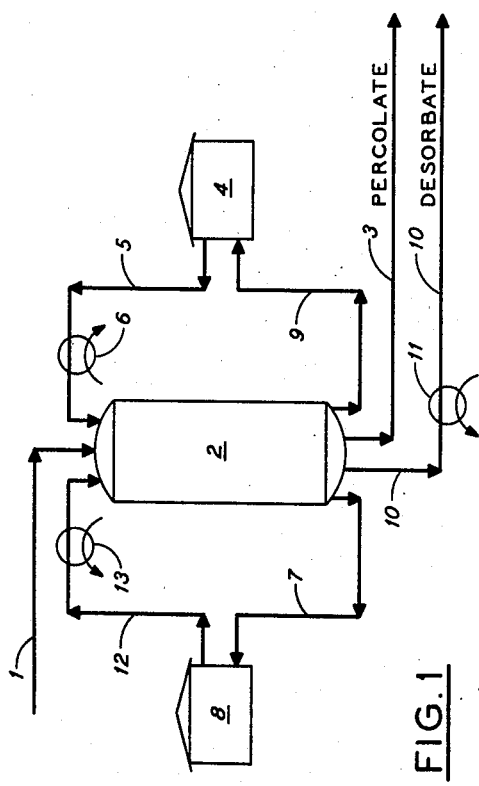

Jan. 20, 1959  J. W. SCOTT, JR., ET AL  2,870,230
ADSORPTION SEPARATION PROCESS
Filed July 27, 1956

INVENTORS
JOHN W. SCOTT, JR.
HARRISON M. LAVENDER, JR.
WILLIAM J. ROSSI
BY
ATTORNEYS

United States Patent Office 2,870,230
Patented Jan. 20, 1959

2,870,230

ADSORPTION SEPARATION PROCESS

John W. Scott, Jr., Ross, Harrison M. Lavender, Jr., San Anselmo, and William J. Rossi, Berkeley, Calif., assignors to California Research Corporation, San Francisco, Calif., a corporation of Delaware Application July 27, 1956, Serial No. 600,493

1 Claim. (Cl. 260—674)

This invention relates to a process for separating liquid mixtures containing relatively adsorbable and relatively non-adsorbable components by contacting the liquid with a solid adsorbent to remove the more adsorbable components. More particularly, the invention relates to an improved process for separating petroleum hydrocarbon liquids by selective adsorption of certain components of the liquid on a solid adsorbent. This application is a continuation-in-part of application Serial No. 437,522, filed June 17, 1954, and now abandoned.

In recent years there has been a considerable research effort directed to the development of an adsorption separation process of such efficiency and economy that it can be put into large scale commercial use in the separation of liquid petroleum hydrocarbon streams. That liquid hydrocarbon mixtures can be separated according to molecular type at very high purity has been thoroughly demonstrated. The problem which faces the art is not a problem of operability, but rather one of economics. Petroleum hydrocarbon streams can be separated with almost any desired degree of precision by contacting the liquid hydrocarbon stream with a suitable solid adsorbent such as silica-gel; the degree of separation and the quality of the products obtained by liquid phase selective adsorption are entirely adequate. The process has not been put to commercial use, however, for the reason that no manner of practicing it has thus far been devised which makes the process economics appear attractive enough to warrant commercial installation and use of the process. Thus, the status of the adsorption separation process as applied to liquid hydrocarbons at the present time is one in which the process as a process will accomplish the separations desired to be made, but the cost of making the separation in this manner is so high that the process is not put to use. In order to bring the process of separating liquid hydrocarbons by selective adsorption to a point where it has practical commercial utility, it is necessary to devise a manner of practicing the process which reduces costs and makes the process economically feasible or attractive.

In the processes for separating liquid hydrocarbons by selective adsorption which have been proposed heretofore, the employment of a regenerating liquid has been considered necessary. Such processes are shown, for example, in U. S. Patents Nos. 2,398,101 and 2,599,545. In these processes the hydrocarbon feed is passed through a mass of solid adsorbent until the capacity of the adsorbent to selectively remove the more adsorbable components of the liquid is exhausted. The adsorbent is then regenerated by passing a relatively large volume of a regenerating liquid having a boiling range outside the boiling range of the feed liquid through the adsorbent mass to remove the adsorbed material from the adsorbent and regenerate the adsorbent for re-use. The effluent from the adsorbent mass during regeneration of the adsorbent in this manner is then fractionally distilled to separate the adsorbate and the regenerating liquid. The adsorbate is withdrawn as a product and the regenerating liquid is re-used in subsequent regenerations of the adsorbent mass. The volume of liquid which must be fractionally distilled in this manner is very large. Not only must the effluent from the adsorbent mass during the regeneration step be fractionally distilled, but since the adsorbent mass, when regeneration is complete, is loaded with the regenerating liquid, the first effluent from the adsorbent mass when feed separation is resumed must also be fractionally distilled to separate the regenerating liquid from the portion of the feed which is percolating through the adsorbent mass. Thus, it comes about that in a practical commercial design of an adsorption separation plant adapted to separate large volumes of petroleum hydrocarbons, the distillation facilities may represent the major portion of the plant from the standpoint of cost.

It is an object of the present invention to provide a process for separating liquid mixtures by contacting them with a solid adsorbent, and in which the adsorbent is periodically regenerated for re-use, which eliminates the requirement for auxiliary distillation facilities which have characterized processes heretofore proposed.

Pursuant to the present invention, a liquid mixture containing a minor proportion of a relatively strongly adsorbed aromatic component is contacted in liquid phase at a temperature below about 100° F., e. g., 30–100° F., with a solid adsorbent to selectively adsorb said component, along with other strongly adsorbed polar materials present, and to separate a percolate having a reduced content of said adsorbed components, the adsorbent being periodically regenerated for re-use by first passing therethrough a hot strippant medium comprising partially enriched liquid effluent (e. g., one heated to about 200° F. to 400° F. and containing a larger percentage of aromatics than the fresh feed) to remove the adsorbate from the adsorbent, and then cooling the regenerated adsorbent to a temperature below about 100° F. by passing therethrough a coolant comprising liquid effluent which is relatively lean in said aromatic components, as compared to the fresh feed, following which said feed is again introduced into the cooled adsorbent mass to initiate a new cycle of operation.

Figure 2:
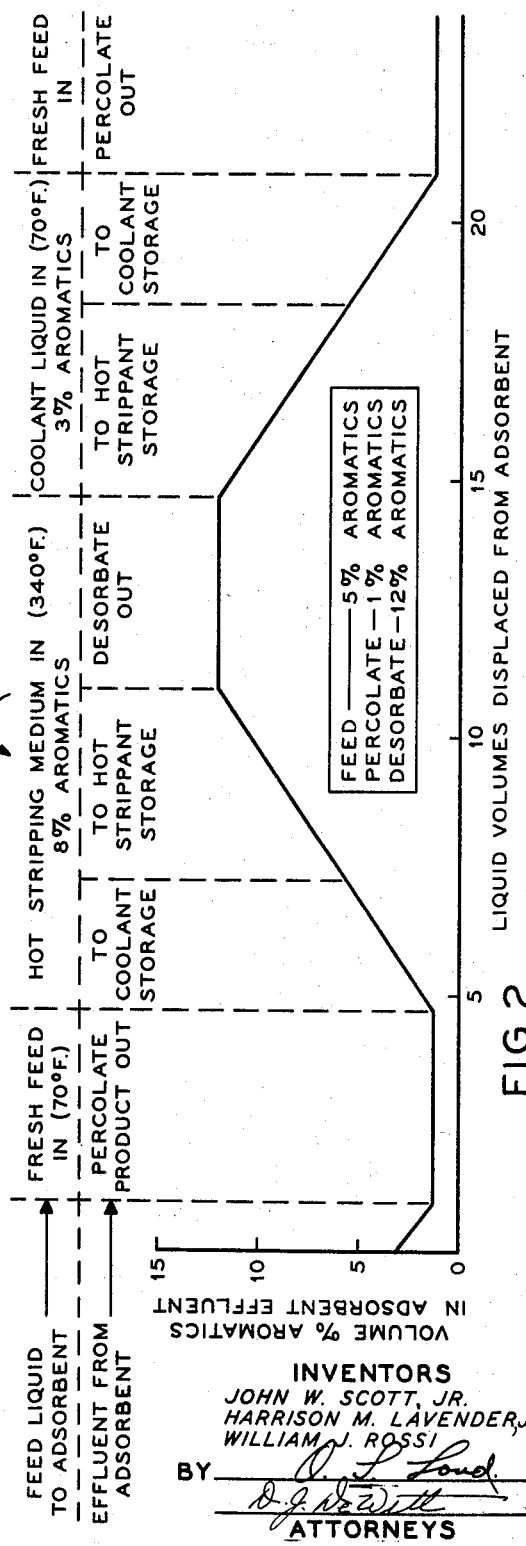

To facilitate the description of the process of the invention, a drawing has been provided wherein Fig. 1 is a diagrammatic illustration of a simple process flow suitable for the practice of the invention, while Fig. 2 is a graphical illustration of the composition of the effluent streams from an adsorbent mass through a given thermal cycle, and showing the disposition of the respective effluent streams.

Referring now to Fig. 1 of the appended drawings, a naphtha containing about 5 volume percent aromatics is passed through line 1 into adsorbent mass 2. A percolate of reduced aromatic content flows from adsorbent mass 2 and is withdrawn through line 3. This portion of the thermal cycle is conducted at about 70° F. The percolate, after a number of cycles have been run so that steady state operation is attained, contains about 1 volume percent aromatics. After the feed has been passed into the adsorbent mass in the manner above described in amount sufficient to exhaust the selective adsorbent capacity of the adsorbent, and at a time when the aromatic content of the percolate in line 3 is just beginning to rise, flow of cold fresh feed through line 1 and of percolate through line 3 is discontinued, and a heating cycle is initiated by starting flow from insulated surge tank 4 through line 5 and heater 6 into the adsorbent mass 2. Tank 4 contains hot and partially enriched (in aromatics) desorbate accumulated from a preceding cycle as described hereinbelow. The stock from tank 4 is heated to about 340° F. in exchanger 6 before entering the adsorbent mass 2. During this heating portion of the cycle the first effluent from the adsorbent mass consists of cold liquid of aromatic content intermediate between that of the percolate and fresh feed. This first effluent flows via line 7 into surge tank 8 where it is stored for use during the next cooling cycle.

When the aromatic content of the first effluent in line 7 during the heating cycle reaches that of the feed, flow through line 7 is discontinued and is switched through line 9 to tank 4 for continued passage through line 5, heater 6, and the mass 2. This second effluent from the adsorbent mass during the heating cycle consists of liquid intermediate in aromatic content between the feed and the desorbate described hereinbelow. As flow continued through the line 9 circuit, the composition of the effluent therein approaches that of the desorbate product (namely, 12 volume percent aromatics) as the temperature of the effluent approaches the desired final temperature of about 340° F.

When said desorbate composition is reached, flow is discontinued through line 9 and continued from surge tank 4 through line 5 and heater 6. Here, however, the desorbate effluent (of a substantially constant composition of about 12% aromatics) is withdrawn through line 10 and cooler 11 and sent to product storage, the desorbate during this period consisting of a mixture of aromatic adsorbate and partially enriched desorbate from tank 4.

At a time when hot stock from heater 6 has been passed through the adsorbent mass 2 in amount sufficient to remove the adsorbate from the adsorbent, the aromatic content of the stock in line 10 will begin to decrease. At this time, flow is discontinued through lines 5 and 10, and the cooling cycle is initiated by starting flow from tank 8 through line 12 and cooler 13 into adsorbent mass 2. As indicated hereinabove, tank 8 contains stock of aromatic content intermediate between that of the raffinate and the feed. The first effluent from the adsorbent mass during the cooling cycle consists of hot stock intermediate in composition between that of the desorbate and that of the fresh feed. This first effluent flows via line 9 to insulated surge tank 4 for use during the next heating cycle.

When the aromatic content of the first effluent during the cooling cycle in line 9 reaches that of the feed, flow through line 9 is discontinued and switched to the circuit consisting of the adsorbent mass 2, line 7, tank 8, line 12, and cooler 13.

The second effluent from the adsorbent mass during the cooling cycle consists of liquid intermediate in composition between the feed and the percolate. As flow continues through the line 7 circuit, the temperature of the effluent approaches the desired final temperature of about 70° F. When this temperature is reached, flow is discontinued through line 12, and flow of cold fresh feed again initiated through line 1. This flow is continued until the aromatic content of the second effluent during the cooling cycle reaches the percolate composition of about 1 volume percent aromatics. At this time flow is discontinued through line 7, and percolate product of substantially constant composition is removed through line 3 to product storage.

After the feed has been passed into the adsorbent mass 2 in amount sufficient to exhaust the selective adsorbent capacity of the adsorbent, and at a time when the aromatic content of the percolate is beginning to rise, flow of fresh feed through line 1 and of percolate through line 3 is discontinued, and a new heating cycle initiated thus repeating the series of operations described hereinabove.

Fig. 2 of the appended drawing shows the results to be obtained charging a feed consisting of approximately 95% isooctane and 5% benzene through a 28–200 mesh silica-gel adsorbent. It will be noted from Fig. 2 that when the freshly regenerated bed, at a temperature of about 70° F., is supplied with fresh feed, a percolate product is obtained containing approximately 1% aromatics. As the effluent thereafter begins to rise in aromatic content, the heating portion of the regenerating cycle is commenced by introducing hot stripping medium at about 340° F. and containing an average of about 8% aromatics. The first portion of the effluent obtained during this heating period is sent to storage for use in the cooling portion of the cycle, while the next portion of the effluent, having an aromatics content intermediate that of the fresh feed and of the next-obtained desorbate product, is returned or otherwise directed to a tank containing the hot stripping medium. In the next portion of the cycle, wherein feeding of the hot stripping medium is continued, the effluent levels out at a generally constant aromatics content of approximately 12%, and this effluent fraction is regarded as desorbate product. As the aromatics content of the desorbate begins to decrease, the cooling portion of the cycle is initiated by supplying a coolant liquid at approximately 70° F. and containing about 3% aromatics. The initial portion of the effluent obtained on feeding the coolant liquid is sent to the tank containing the hot strippant medium (to be used in the next cycle), while the portion on the effluent obtained in the latter phases of the cooling period, and which contains less aromatics than the fresh feed, is returned to the tank employed to contain the coolant liquid. As the effluent now begins to level out at the low aromatics content characteristic of the coolant product, the flow of coolant liquid is shut off and fresh feed is again introduced at 70° F. to initiate the next operating cycle.

In general, it may be stated that any feed which is amenable to separation by being contacted in liquid phase with a solid adsorbent can be advantageously treated pursuant to the process of the invention. The process of the invention is particularly well adapted to the treatment of hydrocarbon streams such as those which are commonly produced in petroleum refineries. Hydrocarbon oils containing minor proportions of aromatics, especially those containing below about 10% by volume of aromatics, are readily, efficiently and economically treated by the process of the invention to produce a percolate having a very minor content of aromatics below 1% by volume and a desorbate stream which is considerably richer in aromatics than the feed. Mixtures of paraffins and olefins such as are obtained when a paraffinic hydrocarbon is subjected to dehydrogenation to increase octane number through the production of olefins can be treated by the process of the invention to separate a paraffinic percolate and an olefin-rich desorbate. Products such as those produced in the Fischer-Tropsch synthesis can be treated by the process of the invention to separate a percolate which consists essentially of hydrocarbons and is substantially free of oxygenated compounds and a desorbate which consists of a mixture of hydrocarbons and oxygenated compounds and has a substantially higher content of oxygenated compounds than the crude Fischer-Tropsch synthesis product. The feeds treated pursuant to the process of the invention are desirably of relatively narrow boiling range and desirably boil above about 200° F. Lower boiling materials can be separated pursuant to the process of the invention, but the hot portion of the cycle should be conducted under pressure to obtain good desorption. Various petroleum hydrocarbon streams containing minor amounts usually below 3% by volume of sulfur and nitrogen compounds can be treated pursuant to the invention to produce a substantially odorless percolate and a desorbate much richer in nitrogen and sulfur compounds than the feed which can be subjected to thermal or catalytic treatment to destroy the sulfur and nitrogen compounds. Operation in this manner permits the removal or destruction of sulfur and nitrogen compounds with minimum stock loss because only the small volume of concentrate need be subjected to the thermal or catalytic treatment.

The adsorbent employed in the process of the invention need only be an adsorbent having selectivity for the component of the feed which it is desired to remove. Thus, the adsorbent may be silica-gel, silica-alumina-gel, various other metal oxide hydrogen materials conforming generally to silica-gel in their adsorptive properties, or charcoal. In the separation of hydrocarbons or of sulfur and nitrogen compounds from hydrocarbons, an adsorbent of the silica-gel type is ordinarily employed. It will be recognized by those skilled in the art that the process of the invention does not reside in the selection of a particular adsorbent, but rather it constitutes an economic method of conducting any given adsorption separation where a particular solid adsorbent acts on a particular liquid feed to remove a component of that feed.

The separation portion of the thermal cycle is generally conducted at temperatures below about 100° F., that is to say the feed is cooled to a temperature below about 100° F. prior to its introduction into the adsorbent mass. It is recognized that some heat of adsorption may be released during treatment and that the temperature existing within the adsorbent mass may be somewhat above the temperature of the feed at the inlet to the adsorbent mass. The regeneration portion of the thermal cycle is conducted at temperatures generally in the range from 200 to 500° F., preferably in the range from about 250 to 350° F. At lower temperatures desorption of the adsorbed materials proceeds slowly and the net capacity of the unit is greatly reduced, and at higher temperatures adsorbent life is decreased by thermal fraction and deposition on the adsorbent of polymers and tarry materials which are difficult to remove.

The volume of feed or recycle liquid passed through the adsorbent mass during each portion of the thermal cycle will vary considerably depending upon the composition of the feed. The guiding principle is that during the cool portion of the thermal cycle, the quantity of feed passed into the adsorbent mass should be just sufficient to exhaust the capacity of the adsorbent mass to selectively adsorb the more adsorbable component of the feed which it is desired to separate. There is no point of continuing passage of cold feed or recycle liquid through the adsorbent mass after this point is reached, since no separation will be accomplished. As soon as a quantity of cold feed sufficient to exhaust the capacity of adsorbent has been introduced into the adsorbent mass, the introduction of hot feed or recycle liquid is commenced. Ordinarily, the quantity of hot feed or recycle liquid which must be passed into the adsorbent mass to remove the adsorbate and regenerate the adsorbent is equal to from 1.0 to 1.5 times the combined volume of the void space in the adsorbent mass and the pore space of the adsorbent, i. e., the combined volume of the interstitial space between the adsorbent particles and the volume of the interparticle pore space.

We claim:

A method for separating liquid feed mixtures containing a minor proportion of aromatic components into product percolate and desorbate streams of reduced and enhanced aromatic content, respectively, as compared with that of the feed mixture, which comprises passing the liquid feed mixture through a bed of solid, regenerated adsorbent at a temperature below about 100° F. while recovering from the bed a product percolate stream of reduced aromatic content; thereafter regenerating the adsorbent bed by the practice of successive heating and cooling steps, the heating step comprising passing a hot strippant liquid through the bed at a temperature about 200° F. while segregating within the system the effluent streams obtained during the initial and mid-portions of the heating step and withdrawing from the system as a product desorbate stream of enhanced aromatic content the effluent obtained from the bed during the final portion of the heating step, and the cooling step comprising cooling the bed to a temperature below about 100° F. by passing therethrough a coolant liquid while segregating within the system the effluent obtained from the bed during said cooling step, said hot strippant liquid having an aromatic content intermediate that of the feed mixture and the desorbate and consisting of a composite of the effluent obtained during the first portion of the cooling step and a mid-portion of the heating step, and said coolant liquid having an aromatic content intermediate between that of the feed and the percolate and consisting of a composite of the effluent obtained during the initial portion of the heating step and the second, remaining portion of the cooling step; and continuing the cycle of operation by resuming passage of the liquid feed mixture through the regenerated bed at the termination of the cooling step; said process being characterized by the fact that essentially no stock of composition intermediate the percolate and desorbate streams leaves the system.

References Cited in the file of this patent

UNITED STATES PATENTS 2,628,933     Eagle et al.  ---------- Feb. 17, 1953

FOREIGN PATENTS 1,031,703     France  --------------- Mar. 25, 1953

OTHER REFERENCES

Eagle et al.: Ind. and Eng. Chem., vol. 42, pages 1294–99 (1950).